United States Patent
Lofland et al.

(10) Patent No.: US 6,959,126 B1
(45) Date of Patent: Oct. 25, 2005

(54) MULTIPURPOSE TESTING SYSTEM FOR OPTICAL CROSS CONNECT DEVICES

(75) Inventors: Rob Lofland, Sunnyvale, CA (US); Kevin White, Los Gatos, CA (US); Kaushal K. Agrawal, San Jose, CA (US); Peter Hunt, Scotts Valley, CA (US)

(73) Assignee: Calient Networks, San Jose, CA (US)

( * ) Notice: Subject to any disclaimer, the term of this patent is extended or adjusted under 35 U.S.C. 154(b) by 330 days.

(21) Appl. No.: 10/072,682

(22) Filed: Feb. 8, 2002

(51) Int. Cl.[7] ............................. G02B 6/26; G02B 6/42
(52) U.S. Cl. .......................... 385/16; 385/20; 385/24; 398/12; 398/19
(58) Field of Search .................. 385/16–24; 398/9, 398/10, 12, 16, 17, 19

(56) References Cited

U.S. PATENT DOCUMENTS

| | | | | |
|---|---|---|---|---|
| 6,456,751 | B1 | * | 9/2002 | Bowers et al. ............... 385/16 |
| 6,519,383 | B1 | * | 2/2003 | Cannell ........................ 385/18 |
| 6,574,384 | B1 | * | 6/2003 | Cannell et al. ............... 385/16 |
| 6,590,644 | B1 | * | 7/2003 | Coin et al. ................... 356/218 |
| 2002/0041409 | A1 | * | 4/2002 | Laham et al. ................ 359/110 |
| 2003/0044107 | A1 | * | 3/2003 | Tamer et al. ................. 385/18 |
| 2003/0210850 | A1 | * | 11/2003 | DeAngelis et al. ........... 385/17 |

FOREIGN PATENT DOCUMENTS

WO        WO 99/66354        12/1999

* cited by examiner

Primary Examiner—Akm Enayet Ullah
Assistant Examiner—Kevin S. Wood
(74) Attorney, Agent, or Firm—Beyer Weaver & Thomas, LLP

(57) ABSTRACT

A technique is disclosed for performing testing of an optical device under test (DUT). According to a specific embodiment, the DUT includes a plurality of DUT optical input ports and a plurality of DUT optical output ports. The testing may be performed by an optical switching testing system (OSTS) which includes a plurality of OSTS output ports optically connected to a plurality of DUT input ports, and a plurality of OSTS input ports optically connected to a plurality of DUT output ports. Components of the OSTS are configured in order to perform a specific test on the DUT. A first test scenario is configured at the DUT. At least one optical test signal is transmitted to at least one DUT input port. Test results may then be obtained by monitoring at least one DUT output port for the presence or absence of light. The test results are then analyzed for specific characteristics. According to a specific embodiment, the OSTS of the present invention may be adapted to automatically perform a plurality of testing operations on a selected plurality of different optical paths associated with the DUT. Such testing operations may include, for example, transmitting a plurality of optical test signals to a plurality of DUT input ports during a given test scenario, and/or monitoring a plurality of DUT output ports for test results during a given test scenario. According to a specific embodiment, the optical switch testing system of the present invention may be used to measure and verify selected characteristics associated with a device under test (DUT) or a system under test (SUT). Such characteristics may include, for example, optical cross talk, insertion loss, polarization dependent loss, path switching time, data integrity, optical path verification, optical path stability, etc.

47 Claims, 11 Drawing Sheets

Fig. 11A

Output Ports 1104

| | Output Port 0 | Output Port 1 | Output Port 2 | Output Port 3 |
|---|---|---|---|---|
| Input Port 0 | Insertion Loss Value A | Insertion Loss Value B | ... | |
| Input Port 1 | Insertion Loss Value C | Insertion Loss Value D | ... | |
| Input Port 2 | Insertion Loss Value E | Insertion Loss Value F | ... | |
| Input Port 3 | ... | | | |

Input Ports 1102

Fig. 11B

Output Ports 1104

| | Output Port 0 | Output Port 1 | Output Port 2 | Output Port 3 |
|---|---|---|---|---|
| Input Port 0 | Time Value A | Time Value B | ... | |
| Input Port 1 | Time Value C | Time Value D | ... | |
| Input Port 2 | Time Value E | Time Value F | ... | |
| Input Port 3 | ... | ... | ... | |

Input Ports 1102

MULTIPURPOSE TESTING SYSTEM FOR OPTICAL CROSS CONNECT DEVICES

RELATED APPLICATION DATA

The present application related to U.S. patent application No. 09/548,587 for "FEEDBACK STABILIZATION OF A LOSS OPTIMIZED SWITCH" by John Bowers filed on Apr. 13, 2000, the entirety of which is incorporated herein by reference for all purposes.

The present application is also related to U.S. patent application No. 09/805,528 for "AN OPTICAL SWITCH WITH INTERNAL MONITORING" by David Edward Welsh, Roger Jonathan Helkey, Adrian Keating, Daniel J. Blumenthal, and Walter Joseph Fant, filed on Mar. 12, 2001, the entirety of which is incorporated herein by reference for all purposes.

The present application is also related to U.S. patent application No. 09/854,265 for "PERFORMANCE MONITORING IN MULTI-STAGE SWITCHES" by Dan Blumenthal, Walt Fant, Roger Jonathan Helkey, and Charles Corbalis, filed on May 10, 2001, the entirety of which is incorporated herein by reference for all purposes.

The present invention is also related to U.S. patent application Ser. No. 09/904,103, filed Jul. 11, 2001, naming Fant et al. as inventors, the entirety of which is incorporated herein by reference for all purposes.

BACKGROUND OF THE INVENTION

1. Field of the Invention

The present invention relates to optical technology, and more specifically relates to a multipurpose testing device for use in testing various parameters relating to optical cross connect switching devices.

2. Description of Related Arts

Communication technology has progressed significantly in the past few years. Today, much information is carried over optical communications fiber. This technology, known as fiber optic technology, allows for the transport of information at data rates currently exceeding billions of bits of information per second. Part of the technology that enables this optical communication is the ability to direct light onto an optical fiber and switch that light appropriately. For example, it is desirable to provide the ability to switch an optical signal from one optical fiber to another optical fiber. In recent years there have been extensive efforts to develop commercially viable optical switches.

Presently there are a variety of different types of optical switch architectures available on the market. One proposed optical switch architecture contemplates the use of arrays of Micro Electro-Mechanical Systems (MEMS) mirrors to accomplish the switching. An example of such an optical switching system is described in U.S. Provisional Patent Application No. 60/088,075, filed on Jun. 6, 1998, naming Herzel Laor as inventor (also published as International Publication Number WO 99/66354), the entirety of which is incorporated herein by reference for all purposes.

FIG. 1 shows a block diagram of a conventional photonic cross connect optical switching system configuration 100 which may be used for switching, in the optical domain, optical signals received on any of the input ports 102 to any desired output port 104. As shown in FIG. 1, the optical cross connect system 100 includes an optical cross connect or switching device 110 which includes a plurality of input ports 102 configured to receive a plurality of different optical signals via input fibers 103. The optical cross connect device 110 also includes a plurality of output ports 104 for providing output optical signals on output fibers 105. The optical cross connect device 110 is used to provide optical switching capability in order to optically couple an optical signal from any desired input port 102 to any desired output port 104. Thus, for example, the optical cross connect device 110 may be configured to couple, in the optical domain, input port 102a to output port 104c to thereby optically switch optical signals on input fiber 103a to output fiber 105c.

It will be appreciated that the optical cross connect device of FIG. 1 corresponds to a photonic optical switch which is configured to switch optical signals in the optical domain rather than in the electrical domain. Manufacturers and users of photonic optical switching systems such as that shown in FIG. 1 will periodically have the desire to verify that the photonic cross connect device is functioning properly. For example, a manufacturer of a photonic optical switch may desire to perform path verification of the switching device by verifying, for example, that a selected input fiber is optically connected only to a desired output fiber, and that no portion of the input optical signal is detected on any other output fiber except the desired output fiber.

Currently, there is only a limited selection testing equipment available on the market for testing and verifying the different functional aspects performed by photonic optical switches. FIG. 2 shows an example of a conventional testing system configuration which may be used to test various aspects of an optical switching system such as that illustrated in FIG. 1. As shown in the example of FIG. 2, two optical switch testing devices 120a and 120b are used to verify the cross connect connectivity between selected input fibers 103 and selected output fibers 105. Such conventional testing equipment may be provided by manufacturers such as, for example, Anritsu Corporation of Japan, and Agilent Techologies, Inc. of Palo Alto, Calif.

According to conventional techniques, in order to verify the optical cross connect connectivity between a selected input fiber and a selected output fiber, a first testing device 120a is optically coupled to a selected input fiber (e.g. 103a) and a second testing device 120b is optically coupled to a selected output fiber (e.g. 105a). A test optical pattern is then transmitted by the first testing device 120a on input fiber line 103a. A first aspect of the cross connect connectivity verification check is performed by detecting whether the test optical pattern (sent by testing device 120a on input line 103a) is detected on output line 105a. The second testing device 120b is therefore connected to the output fiber 105a in order to detect the presence of the test optical pattern.

Assuming that the test optical pattern is detected on the desired output line 105a, a second aspect of the cross connectivity verification test is performed by verifying that the test optical pattern is not detected on any other output fiber except the desired output fiber 105a. In order to accomplish this second aspect of the cross connectivity verification test, testing device 120b must be manually coupled to each individual output fiber 104a-n in order to test for the presence of the test optical pattern. However, it will be appreciated that such a testing scheme is labor intensive, and may require a significant amount of time to complete. Moreover, as the number of input fibers and output fibers increase, the length of time needed to perform conventional cross-connect verification testing increases exponentially, and eventually becomes an impractical and unworkable task.

An alternative solution is to provide a separate testing device on each input fiber and/or output fiber in order to reduce the time required to perform the cross connect verification testing. However, currently the cost of conventional optical switch testing devices range, for example, from $200,000 to $500,000 for each piece of testing equipment. Accordingly, a solution which calls for multiple testing devices may prove to be cost prohibitive.

In light of the above, it will be appreciated that there exists a continuing need to improve upon optical switch testing technology.

SUMMARY OF THE INVENTION

According to different embodiments of the present invention, an optical switch testing system (OSTS) is described for testing a device under test (DUT), such as, for example, a photonic optical switch. The DUT includes a plurality of DUT optical input ports and a plurality of DUT optical output ports. The OSTS comprises, among other things, at least one processor, memory, a plurality of OSTS output ports, a plurality of OSTS input ports, an optical test stimulation component, and an optical test detection component. According to a specific embodiment, a selected plurality of the OSTS output ports are each optically connected to a respective DUT input port, and a selected plurality of the OSTS input ports are each optically connected to a respective DUT output port. Additionally, according to a specific embodiment, the optical test stimulation component is adapted to generate optical test signals to be transmitted to a selected plurality input ports of the DUT, and the optical test detection component is adapted to detect the presence or absence of light on a selected plurality output ports of the DUT.

According to a specific embodiment, the optical switch testing system of the present invention may be used to measure and verify selected characteristics associated with a device under test (DUT) or a system under test (SUT). Such characteristics may include, for example, optical cross talk, insertion loss, polarization dependent loss, path switching time, data integrity, optical path verification, optical path stability, etc.

Alternate embodiments of the present invention are directed to various methods and systems for performing testing of an optical device under test (DUT). According to a specific embodiment, the DUT includes a plurality of DUT optical input ports and a plurality of DUT optical output ports. The testing may be performed by an optical switching testing system (OSTS) which includes a plurality of OSTS output ports optically connected to a plurality of DUT input ports, and a plurality of OSTS input ports optically connected to a plurality of DUT output ports. Components of the OSTS are configured in order to perform a specific test on the DUT. A first test scenario is configured at the DUT. At least one optical test signal is transmitted to at least one DUT input port. Test results may then be obtained by monitoring at least one DUT output port for the presence or absence of light. The test results are then analyzed for specific characteristics. According to a specific embodiment, the OSTS of the present invention may be adapted to automatically perform a plurality of testing operations on a selected plurality of different optical paths associated with the DUT. Such testing operations may include, for example, transmitting a plurality of optical test signals to a plurality of DUT input ports during a given test scenario, and/or monitoring a plurality of DUT output ports for test results during a given test scenario.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 11A shows an example of an insertion loss report which may be generated in accordance with a specific embodiment of the present invention.

FIG. 11B shows an example of a path switching analysis report in accordance with a specific embodiment of the present invention.

DETAILED DESCRIPTION OF THE PREFERRED EMBODIMENTS

According to various aspects of the present invention, a novel optical switch testing system is described which provides a number of features and advantages not provided by conventional optical switch testing techniques. For example, as described in greater detail below, the optical switch testing system of the present invention may be used to quickly and economically test all desired optical paths which can be switched by an N×M optical switch. Additionally, the optical switch testing system of the present invention may also be used to measure and verify selected characteristics associated with a device under test (DUT) or a system under test (SUT). Such characteristics may include, for example, optical cross talk, insertion loss, polarization dependent loss, switching time, data integrity, optical path stability (e.g. path fluctuations over time, adjacent path setup/tear down interference, etc.), etc.

According to a specific embodiment, the optical switch testing system (OSTS) of the present invention may be configured or designed to include functionality relating to optical path identification and power monitoring. Path identification may be performed using a "wink" pulse that is synchronized to a system clock. The wink signal is passed through the device under test (DUT) (such as, for example, a photonic cross connect device), and detected back at the OSTS. If a path is not connected correctly, the wink signal will not be detected in the expected timeslot. Power monitoring may be performed by setting either upper or lower power thresholds. The OSTS may then detect when the power value on a selected channel is crossed, either above or below specified threshold(s).

Figure 1:
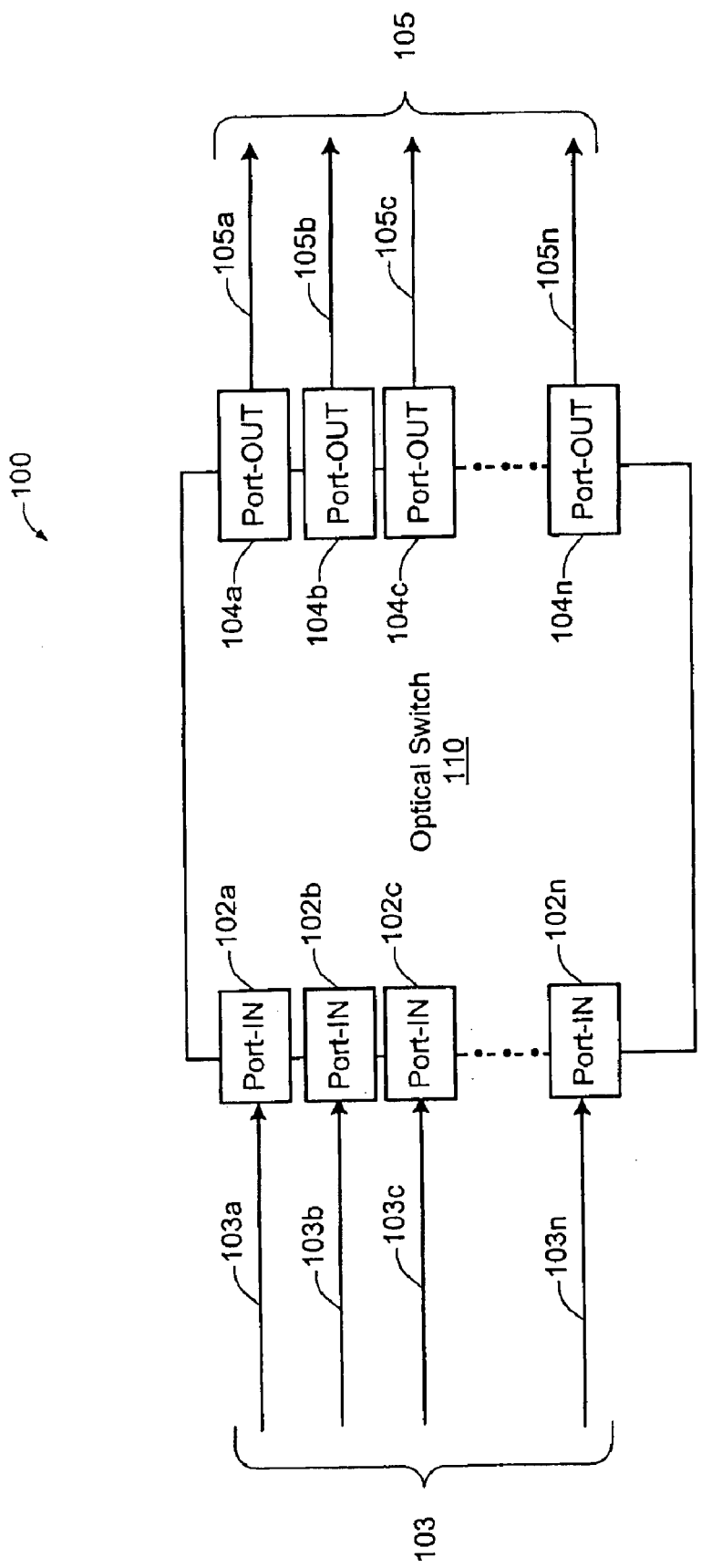
FIG. 1 shows a block diagram of a conventional photonic cross connect optical switching system configuration 100.
Figure 2:
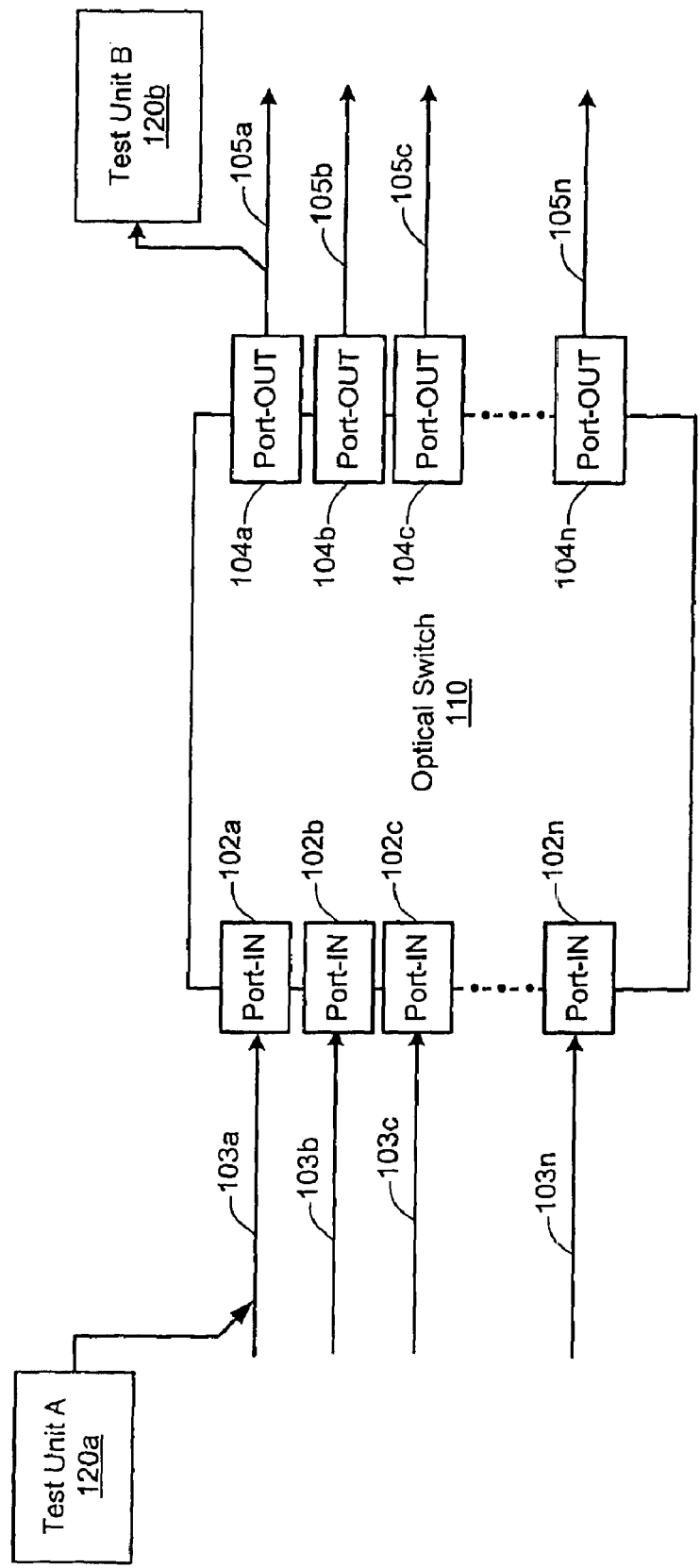
FIG. 2 shows an example of a conventional testing system configuration which may be used to test various aspects of an optical switching system such as that illustrated in FIG. 1.
Figure 3:
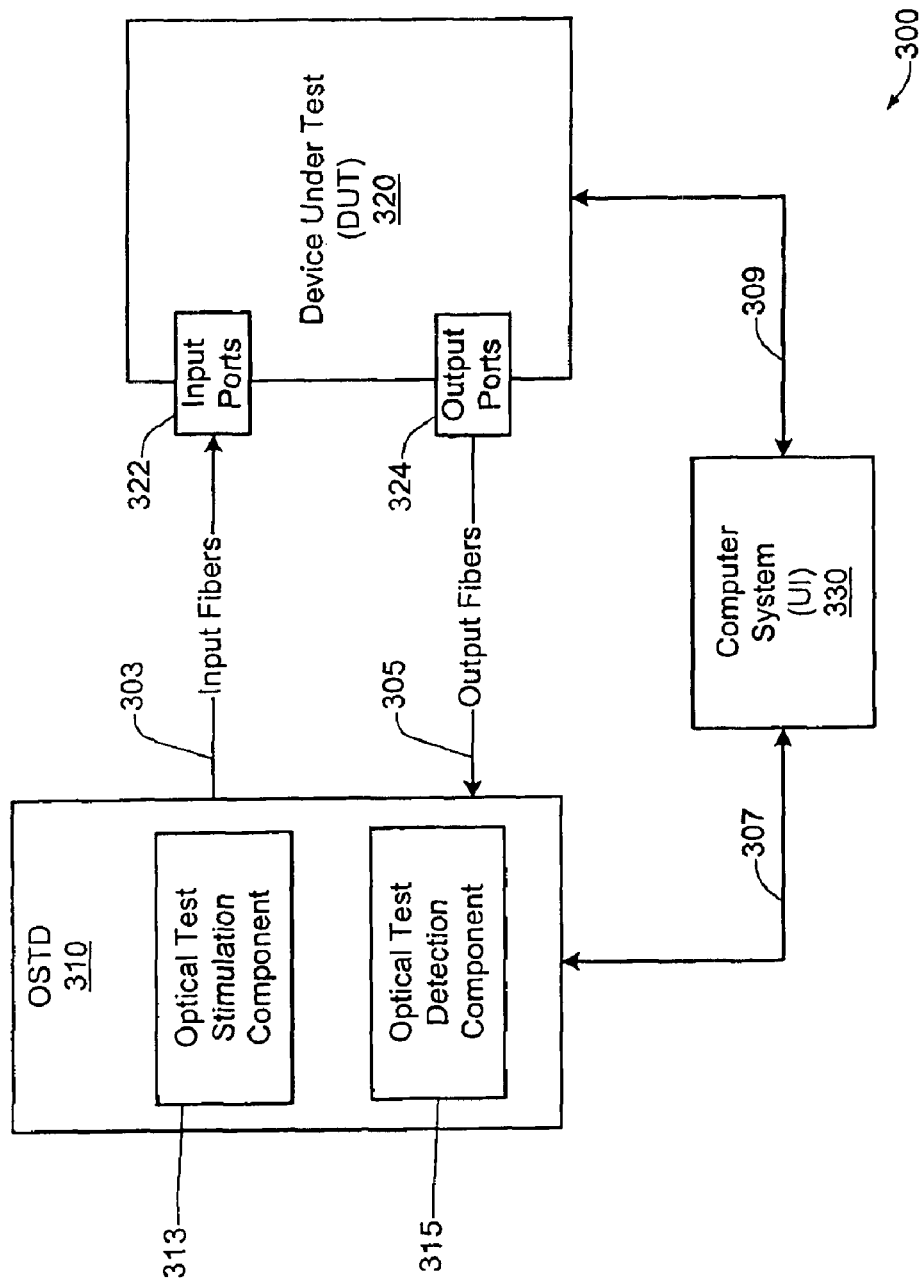
FIG. 3 shows a block diagram of an optical switch testing system (OSTS) 300 which has been implemented in accordance with a specific embodiment of the present invention.

FIG. 3 shows a block diagram of an optical switch testing system (OSTS) 300 which has been implemented in accordance with a specific embodiment of the present invention. As illustrated in the embodiment of FIG. 3, the optical switch testing system 300 includes an optical switch testing device (OSTD) 310 and a computer system 330 which may function as a test controller. The optical switch-testing device 310 may be configured or designed to include an optical test stimulation component 313, and an optical test detection component 315. A plurality of input fibers 303 may be connected from the optical test stimulation component 313 to the plurality of input ports 322 of the device under test 320. According to a specific implementation, the device under test (DUT) may correspond to an N×M optical switch such as, for example, a photonic optical cross connect (PXC) device. A plurality of output fibers 305 may be connected from the plurality of output ports 324 of the DUT 320 to the optical test detection component 315.

The computer system 330 may be used to implement various tests of the DUT 320 using the OSTD 310. For example, specific configuration information and/or test commands may be provided from the computer system 330 to the OSTD 310 and DUT 320 in order to perform a specific test on the DUT. According to a specific implementation, the optical stimulation component 313 may include at least one light source (e.g. laser) for generating optical signals to be transmitted via the input fibers 303 to selected input ports 322 of the DUT. Output optical signals from the DUT are transported from output ports 324, via output fibers 305, to the optical test detection component 315, where upon various characteristics of the output optical signals are analyzed, including the presence or absence of optical signals on selected output ports. The analyzed data may then be reported to a user via computer system 330.

As described in greater detail below, the optical switch testing system of FIG. 3 may be used to test a variety of features and/or characteristics associated with the DUT 320 such as, for example, static optical cross talk, transitional optical cross talk, optical path stability, optical path verification, insertion loss, path switching time, data integrity, etc. Thus, for example, the optical switch testing system of the present invention may be used to verify all desired optical paths of an N×M optical switch, and may also be used to measure the optical performance of each of the paths of the N×M optical switch. Additionally, the optical switch testing system of the present invention may be used to simultaneously verify all desired paths of a single permutation of an N×M optical, thereby resulting in a faster and more economical test solution than that provided by conventional optical switch testing solutions.

According to a specific implementation, the optical switch testing device 310 may include a plurality of generic optical interface cards which are designed to generate specific optical test patterns for testing purposes. Such encoded patterns may be used, for example, to confirm end-to-end connectivity of optical signals passing through the optical switch. An additional benefit of such an implementation is that the interface cards may also be used to measure optical loss and cross talk characteristics of the optical switch, as well as other characteristics.

According to specific embodiments, the optical switch testing system of the present invention may be configured to provide system level test tools that have been developed to meet the system testing needs of electronic and/or photonic cross connects. In one embodiment, the optical switch testing system of the present invention may be implemented using a server-client architecture. For example, the optical switch testing system (OSTS) may be configured as a server which may be accessed via a socket connection. A client is able to connect to the OSTS server and send one or more test commands. The OSTS server may respond by processing the commands using an interface to the OSTS system. Upon completion of the requested command(s), a response may be returned to the client. Additionally, according to a specific embodiment, the OSTS of the present invention may be configured as an off-line testing device for use in testing optical equipment in an isolated environment.

In addition to the functionality described above, the OSTS server may also be configured or designed to serve as a general purpose interface bus (GPIB) gateway. According to a specific implementation, a client may issue a GPIB command to the OSTS server, and the command will then be directed to an appropriate GPIB bus, and the response from the command will be returned.

Figure 4:
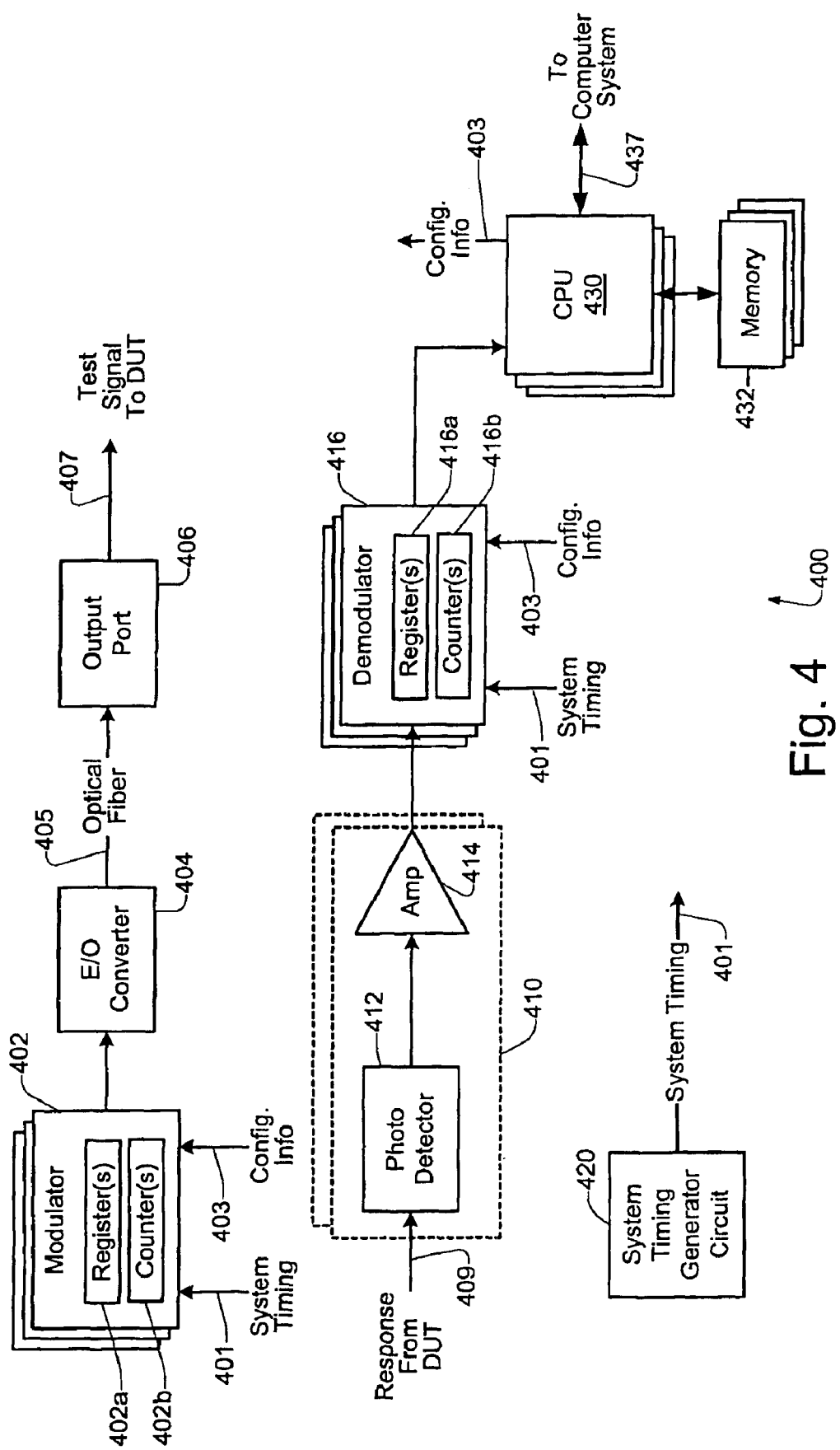
FIG. 4 shows a block diagram of various components which may reside within a specific embodiment of the optical switch testing device 310 of FIG. 3.

FIG. 4 shows a block diagram of various components which may reside within a specific embodiment of the optical switch testing device 310 of FIG. 3. As shown in the embodiment of FIG. 4, the optical switch testing device (OSTD) 400 includes a plurality of modulator circuits 402. Each modulator circuit may be configured or designed to cause modulated light signals to be produced at the OSTD (according to specific parameters) to be sent to a specific input port of the DUT for test purposes. According to a specific implementation, the modulator circuit may also be configured or designed to control the on/off keying of test light signals.

According to a specific embodiment, each modulator circuit 402 may be configured to include at least one register 402a and at least one counter 402Bb. In one implementation, the register(s) 402a may be used for storing configuration information such as that provided, for example, by CPU 430 via line 403. In one implementation, the configuration information may include output port ID information corresponding to one or more selected output ports associated with output ports 406. The counter(s) 402b may be configured to function as timers which utilize one or more system timing reference signal(s) (System Timing 401) provided by system timing generator circuit 420. According to a specific embodiment, the System Timing signal(s) 401 may include, for example, a clock signal, a frame synchronization signal, etc.

According to a specific embodiment, the modulator circuit 402 may be configured to provide specific test signals to a selected output port of the OSTD at specific timeslots. In one implementation, the modulator circuit 402 may provide electrical signals to E/O converter 404, which converts the electrical signals into optical signals. In one implementation, the E/O converter may include a plurality of laser diodes, each having a different frequency. Alternatively, the E/O converter may include a tunable laser diode which generates optical signals at selected frequencies. In this way, the optical switch testing device 400 is able to generate different optical test signals at different desired frequencies.

Optical signals from the E/O converter 404 are directed to appropriate output ports 406 of the OSTD. In one implementation, a designated output port may be specified in the configuration information stored within register 402a. Optical test signals from the OSTD are provided from the output ports 406 to selected input ports of the DUT via a plurality of optical fibers 407. In one implementation, the number of output ports of the OSTD may be at least equal to the number of active input ports associated with the DUT. Further, according to a specific implementation, the number of modulator circuits 402 included with the OSTD may be at least equal to the number of active input ports associated with the DUT. Such a configuration allows multiple input ports of the DUT to be tested simultaneously.

Output optical signals from the output ports of the DUT are fed to a plurality of photodetector circuits 410 which reside at the OSTD 400. According to a specific embodiment, the number of photodetector circuits included within the OSTD may be at least equal to the number of active output ports of the DUT.

As shown in the embodiment of FIG. 4, each photodetector circuit 410 may include a photodetector 412, and an amplifier 414. The photodetector 412 converts optical signals into electrical signals, which may then be amplified by amplifier 414. The signals from the photodetector circuit 410 are fed to one of a plurality of demodulator circuits 416 which are configured to demodulate and process the signals generated at the photodetector circuits. According to a specific implementation, the demodulator circuits may be configured or designed to measure various characteristics or optical signals.

As shown in the embodiment of FIG. 4, a plurality of demodulator circuits 416 may be provided at the OSTD in order to allow multiple signals from multiple photodetector circuits to be processed simultaneously. According to a specific implementation, the demodulator circuits may be arranged in an 8×1 configuration. Each demodulator circuit 416 may include at least one register 416a which may be used for storing configuration information and/or other information, such as, for example, timer count values, MAX_PORT value, pulse counter value, etc. The demodulator circuit may also include at least one counter 416b which may be configured to function as a local timer.

As illustrated in the embodiment of FIG. 4, the optical switch testing device also includes at least one CPU 430 and memory 432. Output signals provided by each of the demodulator circuits 416 may be directed to the CPU 430 for further processing. Software code and/or other instructions for analyzing the results from the DUT may be stored in the memory 432 and utilized by the CPU during analysis of the test results. According to an alternate embodiment, a hard-coded processing device (such as, for example, an FPGA or an ASIC) may be used to analyze at least a portion of the test results. The analyzed data may then be reported to the computer system 330 (FIG. 3) via an appropriate channel or link 437.

The memory 432 may also be configured or designed to store configuration information which may be used for implementing a variety of testing procedures performed by the OSTD. Such configuration information may be retrieved by the CPU 430 and distributed to appropriate modulator circuits and demodulator circuits as conditions warrant.

Figure 5:
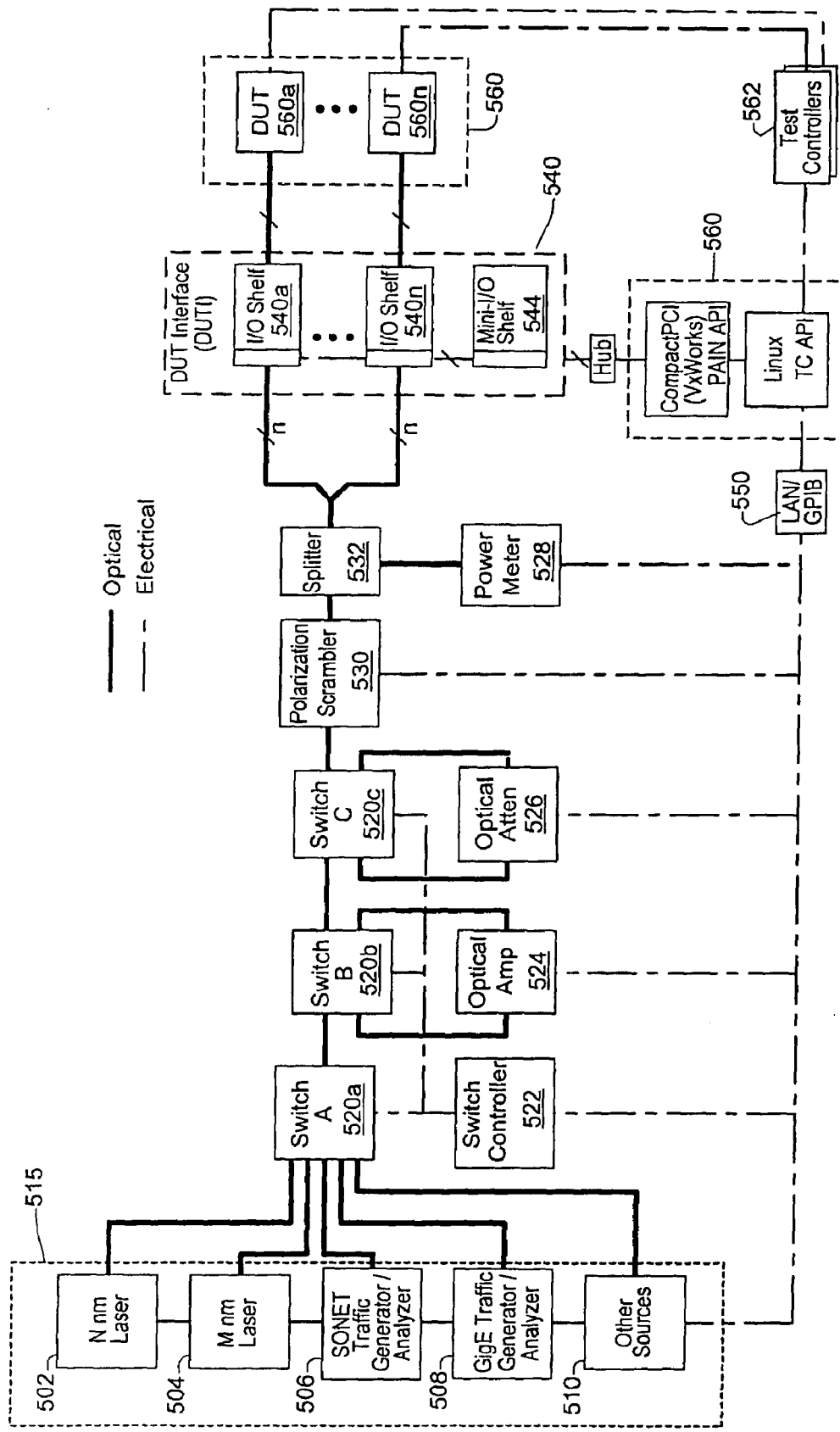
FIG. 5 shows a specific implementation of one embodiment of an optical switch testing system 500 in accordance with the present invention.

FIG. 5 shows a specific implementation of one embodiment of an optical switch testing system 500 in accordance with the present invention. As illustrated in the embodiment of FIG. 5, the optical switch testing system 500 may include a plurality of different sources 515, such as, for example, lasers 502, 504 which may be configured to transmit light at different frequencies; a SONET traffic generator/analyzer 506; a gigabit Ethernet traffic generator/analyzer 508; and/or other sources 510. An N×1 switch 520a may be used to select a particular input source from among the plurality of sources 515. Additional switches 520b, 520c may be provided to allow the insertion of an optical amplifier component 524 and/or an optical attenuator component 526, as desired. Each of the switches may be controlled by a switch controller 522. A polarization scrambler 530 may be provided and activated (if desired) during specific testing procedures such as, for example, during PDL measurements. A splitter 532 (e.g. a 1×N splitter) may be used to provide individual inputs for each port of the DUT interface (DUTI). According to a specific embodiment, the DUTI may include up to n I/O shelves 540 (e.g. n=8). The I/O shelves 540 provide an optical interface to the DUT(s) 560. According to a specific embodiment, the I/O shelves 540 may be controlled, for example, by a PCI processor card 560 which may be configured to run a version of the PXC CP code. In a specific implementation, the processor card 560 may also be configured to provide a suite of primitives for use by test script execution engines on a separate Linux box, for example. In one embodiment, the actual test scripts may be implemented on discrete test controller computers 562, distributed throughout the test LAN.

Figure 8:
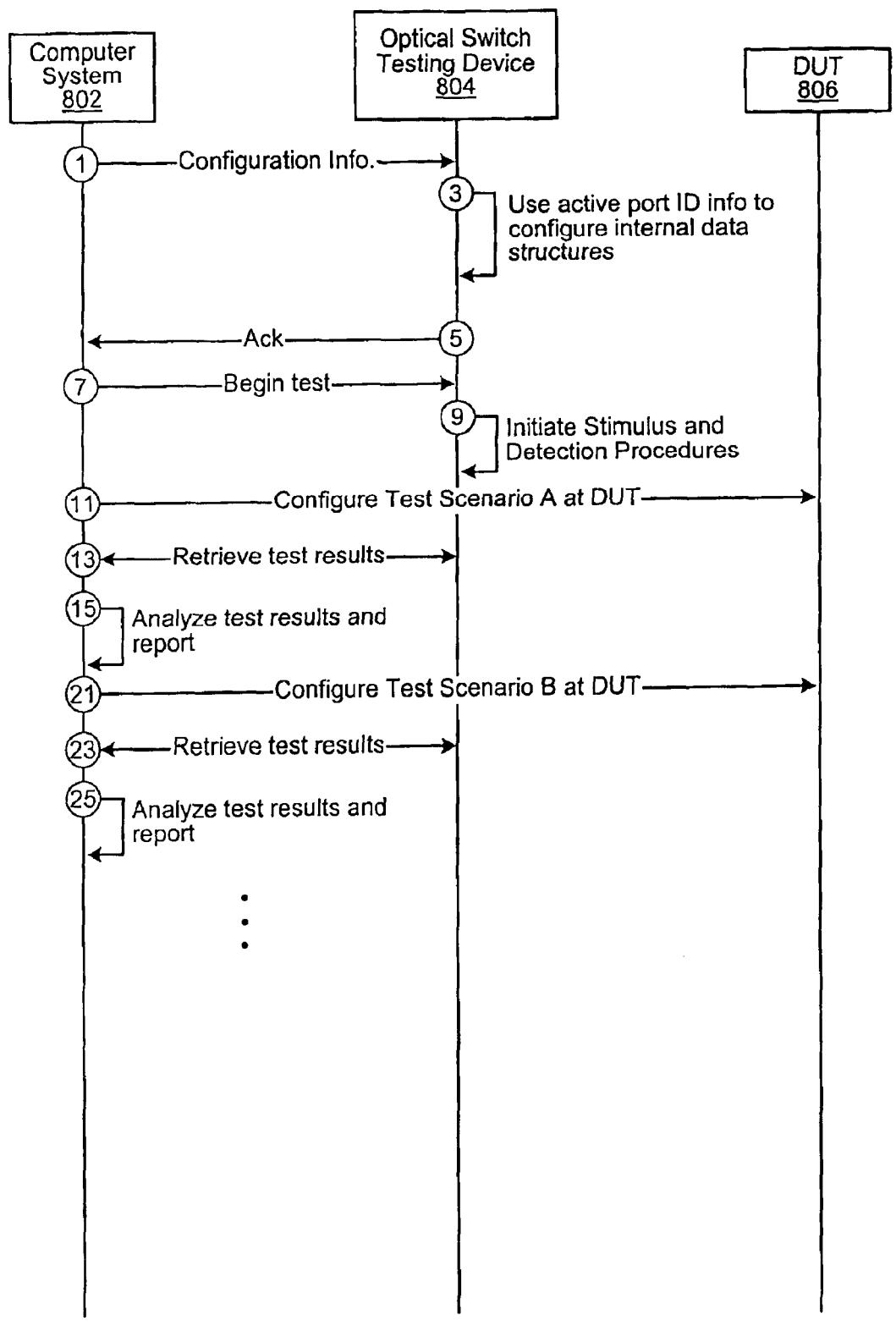
FIG. 8 shows a flow diagram illustrating interactions between various components of a specific embodiment of the optical switch testing system of the present invention during the performance of various tests on a device under test.

FIG. 8 shows a flow diagram illustrating interactions between various components of a specific embodiment of the optical switch testing system of the present invention during the performance of various tests on the DUT. For purposes of illustration, the flow diagram of FIG. 8 will be described with reference to the optical switch testing system 300 of FIG. 3.

Initially, it is assumed that a user desires to initiate one or more tests on the DUT. According to a specific embodiment, the user may initiate selected tests via an interface to the computer system 330. The various tests may either be selected manually by the user, or, alternatively, a plurality of different tests may automatically be implemented in response to a single action. Assuming that the appropriate tests have been selected for implementation, the computer system 802 transmits (1) configuration information to the OSTD 804. In a specific implementation, the configuration information may include the number of active ports associated with the DUT, as well as their associated port IDs.

Upon receiving the configuration information from the computer system 802, the OSTD 804 uses the configuration information to configure (3) its internal data structures. For example, according to a specific embodiment, the OSTD may load appropriate port ID information into the appropriate registers of the optical test stimulation component 313. Additionally, the OSTD 804 may utilize the configuration information to calculate a MAX_PORT value, which, for example, may be used to represent the maximum number of input ports associated with the DUT. After the MAX_PORT value has been calculated, the OSTD loads the MAX_PORT value into appropriate registers of the optical test detection component 315.

Once the OSTD 804 has finished configuring its internal data structures, and is ready to implement testing procedures, it transmits (5) an acknowledgment signal back to the computer system 802. The computer system 802 then initiates testing procedures by transmitting (7) an appropriate "begin test" command to the OSTD 804.

Figure 6:
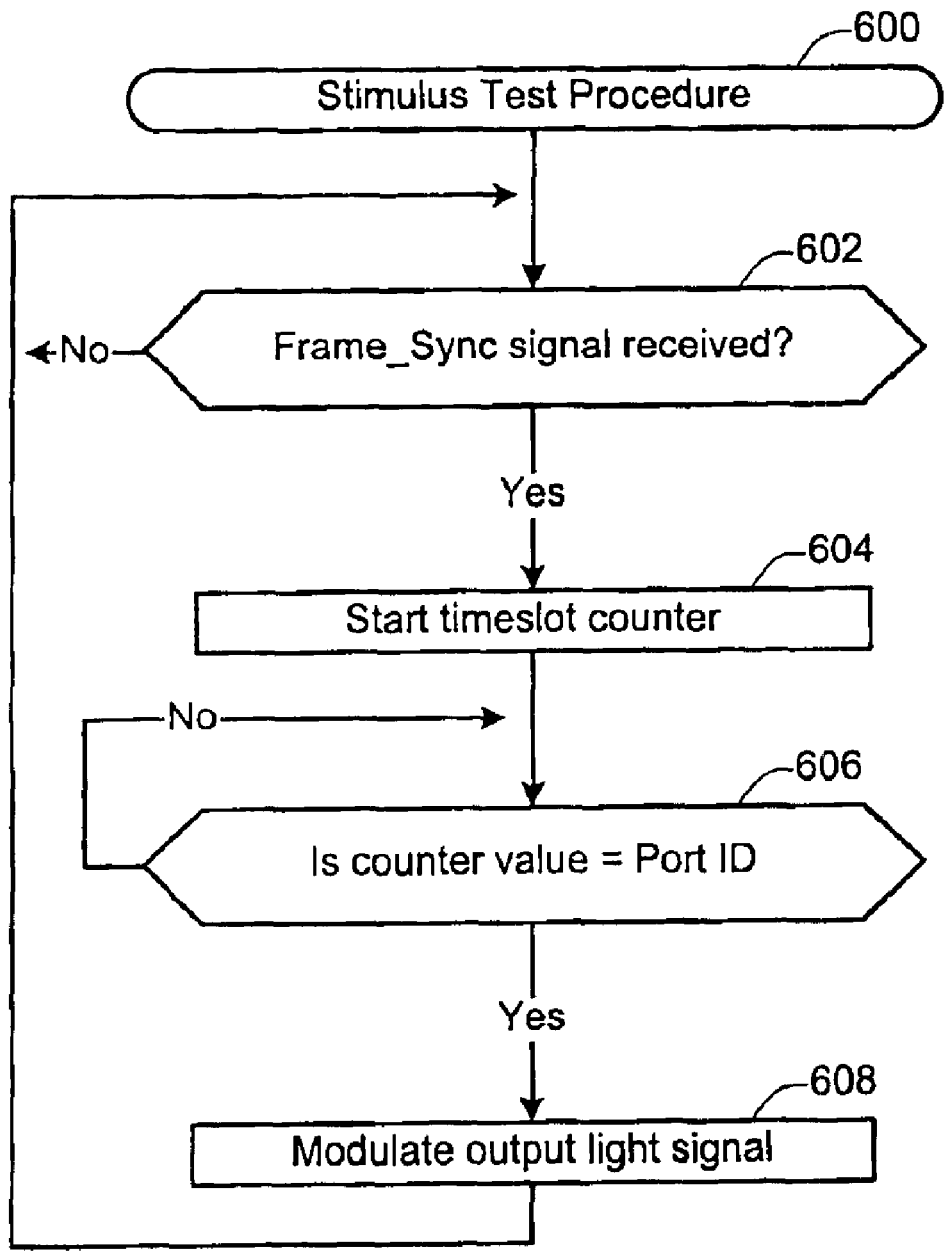
FIG. 6 shows a flow diagram of a Stimulus Test Procedure 600 in accordance with a specific embodiment of the present invention.
Figure 7:
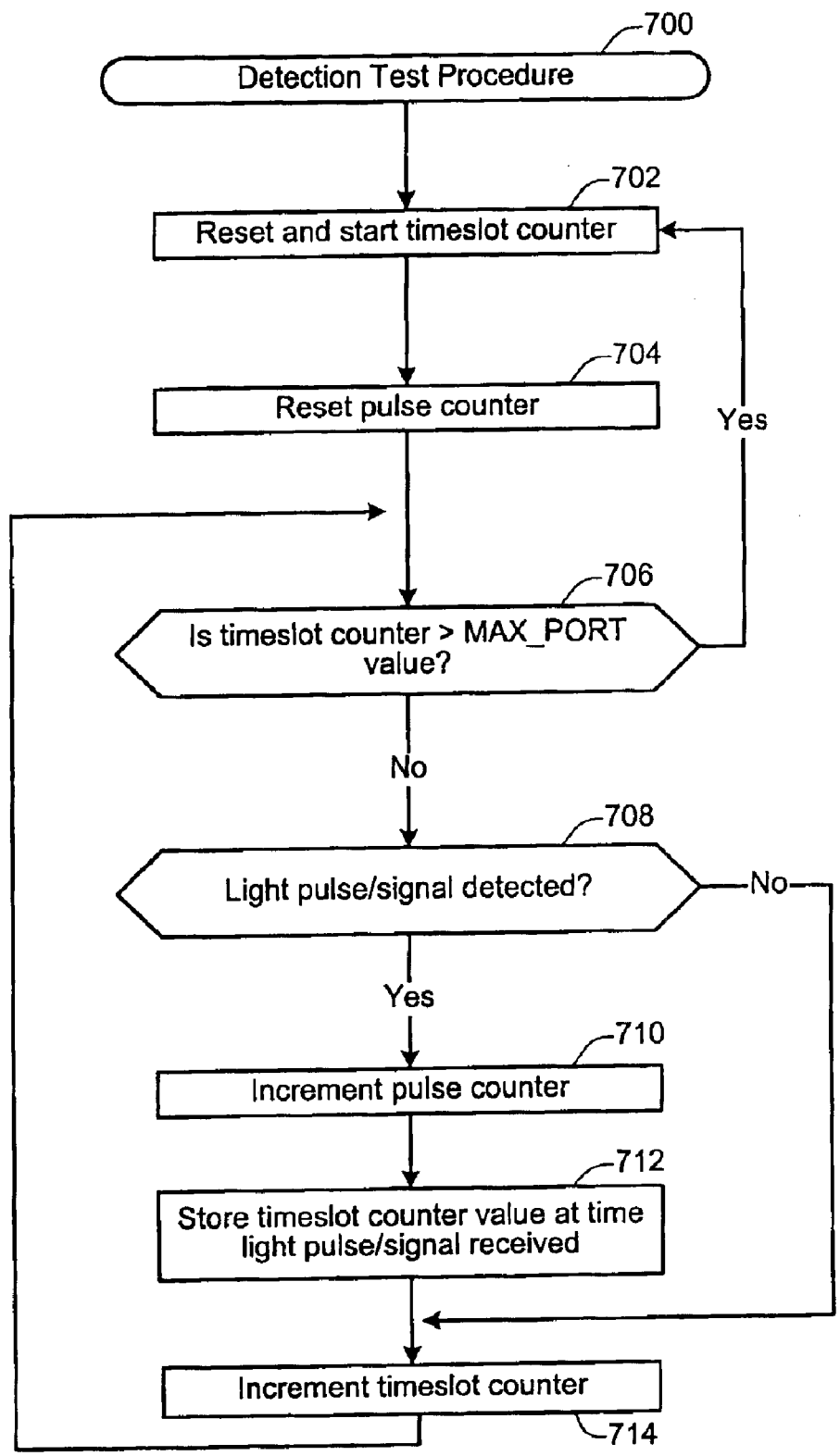
FIG. 7 shows a flow diagram of a detection test procedure 700 in accordance with a specific embodiment of the present invention.

In response to receiving a "begin test" command, the OSTD initiates (9) a stimulus test procedure and a detection test procedure. One function of the stimulus test procedure is to provide at least one optical test signal to at least one input port of the DUT. One function of the detection test procedure is to detect the presence or absence of light on one or more of the output ports of the DUT. Examples of a stimulus test procedure and a detection test procedure are illustrated in FIGS. 6 and 7 of the drawings, which are described in greater detail below.

As explained in greater detail below, the optical switch testing system of the present invention may be used to implement a variety of tests upon the DUT. Each test may be implemented at the DUT in accordance with a specific test scenario. Accordingly, in order to implement a specific test on the DUT in which it is desired to measure, for example, the performance of the DUT under specific conditions, it is preferable to initially configure the DUT so that the desired conditions will be present at the DUT during execution of the specific test.

In the embodiment of FIG. 8, it is assumed that the OSTS is to perform a series of different tests upon the DUT 806. Accordingly, in order to implement a first selected test, the computer system configures (11) a first test scenario (e.g. Test Scenario A) at the DUT. For example, a first test procedure may be to measure optical cross talk properties of the DUT under static conditions (e.g. during times when there is no switching of optical signals at the DUT). Once the DUT has been configured in accordance with the first test scenario, the stimulus and detection procedures implemented at the OSTD may be used to provide a test stimulus to the DUT under the desired conditions, and to extract desired test results. Such test results may include, for example, pulse counter values, recorded timer counter values, stimulus ports IDs, detect port IDs, etc. According to a specific implementation, the test result information may be stored in the counters and/or registers or other memory residing in the optical test detection component 315 of the OSTD.

After a desired test has been performed on the DUT, the computer system 802 retrieves (13) the test results from the OSTD 804. The test results are then analyzed (15) and reported to the user via the computer system interface. Thereafter, the computer system may reconfigure (21) the DUT in order to implement a second test scenario (e.g. Test Scenario B). For example, in the second test scenario, optical cross talk properties of the DUT may be measured during transitional conditions (e.g. during active switching of optical paths at the DUT). Once the DUT has been properly configured, the stimulus and detection procedures may be implemented at the OSTD to provide appropriate test stimulus to the DUT, and to detect desired results. The test results associated with test scenario B may then be retrieved (23) from the OSTD and analyzed (25) by the computer system. The analyzed test results may then be reported to the user via the computer system interface.

It will be appreciated that, in the embodiment of FIG. 8, any number of desired tests may be performed upon the DUT by the optical switch testing system of the present invention by continually reconfiguring the DUT for different test scenarios, implementing the stimulus and detection procedures for each test scenario, and retrieving the desired test results from the OSTD. According to a specific implementation, the stimulus and detection procedures may be designed to run continuously at the OSTD in order to allow new test scenarios to be continuously implemented at the DUT, thereby allowing different test results to be continuously retrieved from the OSTD. Alternatively, once a particular test scenario has been configured at the DUT, the computer system may send a signal to the OSTD to initiate the stimulus and detection procedures for that specific test scenario. According to specific embodiments, different stimulus and detection procedures may be implemented for different test scenarios, if desired.

FIG. 6 shows a flow diagram of a Stimulus Test Procedure 600 in according with a specific embodiment of the present invention. According to one implementation, the Stimulus Test Procedure 600 may be implemented at the optical test stimulation component 313 of FIG. 3. Additionally, according to a specific implementation, a separate instance of the Stimulus Test Procedure may be implemented for each modulator circuit residing in the optical test stimulation component of the OSTD. According to a different embodiment, the number of instances of the Stimulus Test Procedure may be equal to the number of active ports identified at the DUT. One function of the Stimulus Test Procedure is to provide one or more optical test signals to the DUT. Initially, as shown at 602, the Stimulus Test Procedure waits to receive a Frame_Sync signal. In one implementation, the Frame_Sync may be used to synchronize stimulus test patterns generated by the optical test stimulation component of the present invention. According to a specific implementation, the Frame_Sync signal may be generated at the OSTD 310 at periodic intervals, such as, for example, every N timeslots. The value N may vary, for example, depending upon the number of input and/or output ports of the DUT. In a specific embodiment where the DUT is a 2048×2048 optical switch, the value N may be set equal to about 2048 timeslots.

Once a Frame_Sync signal has been received at a particular modulator circuit, the timeslot counter associated with that modulator circuit (e.g. counter 402b) may be reset (e.g. to zero) and started or re-started (604). Once the timeslot counter has been started, the value of the timeslot counter will increase until its value is equal to the value of a specified port ID which, for example, is stored within a register (e.g. 402a) of the modulator circuit. Upon determining that the timeslot counter value is equal to the specified port ID value (606), the optical test stimulation component causes an output light signal to be modulated (608) and sent to the specified port ID corresponding to one of the output ports of the OSTD. From there the optical test signal is transported from the specified output port of the OSTD to an appropriate input port of the DUT. After the optical test signal has been generated and sent to the DUT, the Stimulus Test Procedure may then continue at operation 602 of FIG. 6.

According to a specific embodiment, the presence or absence of optical signals at one or more of the plurality of output ports of the DUT may be detected using a detection test procedure such as that illustrated, for example, in FIG. 7 of the drawings. FIG. 7 shows a flow diagram of a Detection Test Procedure 700 in accordance with a specific embodiment of the present invention. According to one implementation, the Detection Test Procedure may be implemented at the optical test detection component 315 of the optical switch testing system of FIG. 3, and may be used to detect the presence or absence of optical signals at one or more of the plurality of output ports of the DUT. According to a specific implementation, multiple instances of the Detection Test Procedure may be configured to run simultaneously, wherein each instance of the Detection Test Procedure may be associated with a respective output port of the DUT.

As shown at 702, a selected timeslot counter is reset and started. Additionally, as shown at 704, a pulse counter may also be reset. In a specific implementation, the timeslot and/or pulse counters may each correspond to one of the counters 416b which are included in the demodulator circuit 416 of FIG. 4. According to a specific implementation, the pulse counter may be used to keep track of the number of optical signal test pulses which are detected at a specified input port of the DUT during execution of a specific test procedure.

At 706 a determination is made as to whether the timeslot counter value is greater than a MAX_PORT value. According to a specific embodiment, a MAX_PORT value may correspond to the maximum number of active output ports on the DUT. In one implementation, the MAX_PORT value may be stored as part of the configuration information within one or more registers of memory residing in the optical test detection component 315. For example, in a specific implementation, such registers may correspond to registers 416a of FIG. 4.

If it is determined that the timeslot counter is equal to the MAX_PORT value, it may be assumed that the end of a test frame has been reached. Accordingly, the timeslot and pulse counters may be reset, and the timeslot counter restarted (702, 704). If, however, it is determined that the timeslot counter value is not equal to the MAX_PORT value, a determination is made (708) as to whether a light pulse or signal has been detected at a selected output port of the DUT. Assuming that the light pulse/signal has not been detected at the selected output port, then the Detection Test Procedure continues to monitor the selected output port for a light pulse/signal until the timeslot counter value is equal to the MAX_PORT value.

Assuming that a light pulse or other optical signal has been detected at the specified output port, the pulse counter value may be incremented (710). Additionally, the timeslot counter value which existed at the time that the light pulse or signal was detected is stored (712) at the OSTD. According to specific embodiments, this timeslot counter value may be stored, for example, at an appropriate register at the demodulator circuit 416 (FIG. 4), or may be stored at the CPU such as, for example, in memory 432 (FIG. 4). Thereafter, the timeslot counter is incremented (714), and the Detection Test Procedure 700 continues to monitor the specified output port for light pulses or optical signals which may be detected during that particular test frame. Each time a pulse of light is detected at the selected output port of the DUT, the pulse counter is incremented, and the timeslot counter value (corresponding to the timeslot when the light pulse was first detected or received) is recorded. This information may subsequently be analyzed in order to determine the operating functionality and/or specific characteristics of the DUT.

Figure 9:
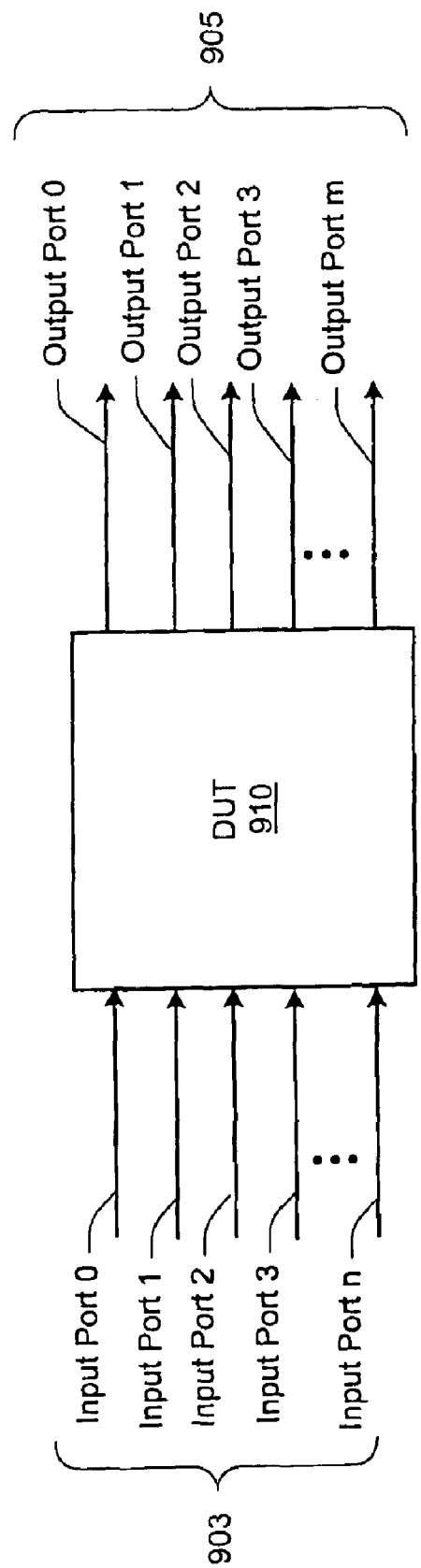
FIG. 9 shows a block diagram of a DUT 910 which may be tested in accordance with the technique of the present invention.

As described previously, the optical switch testing system of the present invention may be used to perform a variety of tests on one or more DUTs. FIG. 9 shows a block diagram of a DUT 910 which may be tested in accordance with the technique of the present invention. In the example of FIG. 9, it is assumed that the DUT 910 corresponds to an N×M optical switch which includes N input ports 903 and M output ports 905. Using the DUT embodiment of FIG. 9, a variety of different test approaches which may be implemented by the optical switch testing system of the present invention will now be described. It will be appreciated that the tests described below represent a portion of the tests which may be performed upon a DUT by the OSTS of the present invention. Other tests not specifically mentioned in this application may also be performed. Such other tests will generally be known to one having ordinary skill in the relevant art.

One type of test which may be performed by the OSTS of the present invention is the measurement of optical cross talk of the DUT, for example, during both static and transitional states of the DUT. The static optical cross talk test may be performed in order to measure the amount of light that is received from paths adjacent to or near a particular optical path under test. For example, according to a specific implementation, the path under test may be darkened and a sensor connected to the path output. The sensor may be zeroed, and then set to detect light at the output of the path under test (PUT). According to a specific implementation, the sensor may correspond to photodetect circuit 410 of FIG. 4, and may be configured to detect light which is above a predetermined threshold value, or may be configured to latch a maximum power value of light detected at the output port of the PUT.

During the static optical cross talk test, optical signals may be sent along adjacent or near paths (as determined by analysis) to the path under test while the path under test remains darkened (e.g. off). According to a specific embodiment, at least a portion of the optical signals may be simultaneously transmitted along the adjacent paths. The readings from the sensor(s) connected to the path under test may then be used to determine pass/fail. According to different embodiments, the static optional cross talk test may be repeated for all desired combinations of paths, wavelengths, and/or polarization states which analysis shows to be relevant.

During a transitional optical cross talk test, the amount of light that is received by neutral paths may be measured as a test path is switched to a new path. Thus, for example, according to a specific embodiment, all or a selected portion of paths may be darkened except for the path being switched. Optical test signals may then be sent along the path being switched at the DUT. The selected darkened paths are monitored for the presence of light while the test path is switched back and forth repeatedly. The darkened paths being monitored may then be examined for the presence of any detected light. According to a specific implementation, the photodetector circuits may be configured to also record the power level of any light detected on the darkened path(s).

According to a specific implementation, a power threshold level may be specified for indicating a failure of the transitional optical cross talk test. For example, according to a specific implementation, a failure may occur is the power level of light detected on anyone of the darkened paths, for example, exceeds a value of Min_Spec_Power—3 dB, wherein the value Min_Spec_Power represents the minimum acceptable threshold power level of an optical signal. According to specific embodiments, the transitional optical cross talk test may be repeated for all desired combinations of paths, wavelengths and/or polarization states which analysis shows to be relevant.

Another test which may be performed by the OSTS of the present invention is an optical path stability test wherein the stability of a test optical path through the DUT is determined as adjacent or near paths are switched. According to a specific implementation, all or selected paths in the DUT may be darkened except for a path under test whose input will receive one or more test optical signals. The output of the path under test may then be monitored in order to detect the maximum power level of light detected at that output.

Relevant adjacent or near paths (as determined, for example, by analysis) may then be switched repeatedly while the output of the path under test is monitored to determine maximum positive variation. The test may then be repeated with the photodetector circuit set to latch the minimum power level of optical signals at the output of the path under test, to thereby determine maximum negative variation. According to a specific implementation, a suggested failure threshold may be defined as a variation of more than 0.5 dB of optical signals detected at the path under test. According to specific embodiments, the optical path stability test may be repeated for all desired combinations of paths, wavelengths and/or polarization states which analysis shows to be relevant.

Another test which may be performed by the OSTS of the present invention is a data integrity test which may be used to confirm that the DUT is capable of carrying specific types of data traffic. For example, according to a specific implementation, a traffic generator may be used to provide data traffic to one or more input ports of the DUT. Data from a selected output port may then be routed to a traffic analyzer in order to calculate a bit error rate (BER) associated specific ports of the DUT. According to a specific embodiment, the traffic analyzer and traffic generator may be integrated together as a single component or device which may reside, for example, in the OSTD 310 of FIG. 3, or may reside as a separate component, external to the OSTD.

Another feature which is provided by the OSTS of the present invention is the ability to monitor the optical characteristics of a DUT over an extended time period. For example, since the OSTS is able to detect power threshold crossings and path misconnects, scripts running on test controller computers (e.g. computer system 330) may be configured to monitor the optical characteristics of the DUT over an extended time period. During the monitoring process, the computer system(s) may be configured to manipulate the DUT over a wide range of operations.

Another test which may be performed by the OSTS of the present invention is an insertion loss test of the DUT which measures the net insertion loss of selected optical paths in the DUT. According to a specific implementation, the insertion loss of specific path under test may be determined by subtracting the optical signal power output (e.g. at a specified output port of the DUT) from the optical signal power input (e.g. as measured at a specified input port of the DUT).

According to different embodiments, a variety of different approaches may be used for implementing insertion loss testing of the DUT. According to a first approach, the optical power input and optical power output levels may be determined using equipment included in the DUT. However, from a quality analysis standpoint, this approach may be undesirable since the DUT is being used to test and report its own performance. A second approach is to use the componentry of the optical switch testing device to measure the optical power input and optical power output from selected input/output ports of the DUT. From a quality analysis standpoint, this approach is acceptable because an external device is measuring the performance of the DUT. According to a specific implementation, the OSTS of the present invention may be used to determine a plurality of insertion loss values as measured at any desired input/output ports of the DUT. An example of such an analysis is shown in FIG. 11A of the drawings.

FIG. 11A shows an example of an insertion loss report which may be generated in accordance with a specific embodiment of the present invention. In the example of FIG. 11A, separate insertion loss values may be measured for each distinct combination of input/output ports of the DUT. Thus, for example, the net insertion loss between Input Port 0 and Output Port 0 is reported as Insertion Loss Value A, and the net insertion loss between Input Port 0 and Output Port 1 is reported as Insertion Loss Value B.

Another test which may be performed by the OSTS of the present invention is a path switching time test which may be used to measure the switching time as measured from when the optical switch receives a command to switch a particular optical path, and the time in which light is first detected at the new optical path's output port. An example of a path switching time analysis report is shown in FIG. 11B. FIG. 11B shows an example of a path switching analysis report which may be generated in response to conducting a path switching time test of the DUT in accordance with a specific embodiment of the present invention. As illustrated in the example of FIG. 11B, a separate path switching time value may be measured for each or any desired combination of input/output ports of the DUT. Thus, for example, Time Value A represents the length of time it takes for a connection to be switched from Input Port 0 to Output Port 0, and Time Value B represents the length of time it takes for a connection to be switched from Input Port 0 to Output Port 1. According to a specific implementation, the path switching time value reflects the time difference between the issuance of a optical path switch command (which is sent to the DUT at time T=0), and the detection of light at the desired output port. According to specific embodiments, the path switching time test may be repeated for all desired combinations of paths which analysis shows to be relevant.

Another test which may be performed by the OSTS of the present invention is a path verification test which may be used to confirm, for example, that a selected input port of the DUT is connected only to a desired output port of the DUT, and not to any other ports. According to a specific implementation of the path verification test, a separate test optical signal pulse or wink signal may be transmitted to each respective input port of the DUT at a unique time period during a given test frame. The optical test detection component 315 may be used to detect the presence or absence of optical signals at the output ports of the DUT. Assuming that an optical test signal is detected at a specific output port of the DUT, the time at which the output signal was detected may be compared to the expected time at which the output test signal should have been detected or received. If there is a mismatch in the detected and expected time values, an error may be reported.

Figure 10:
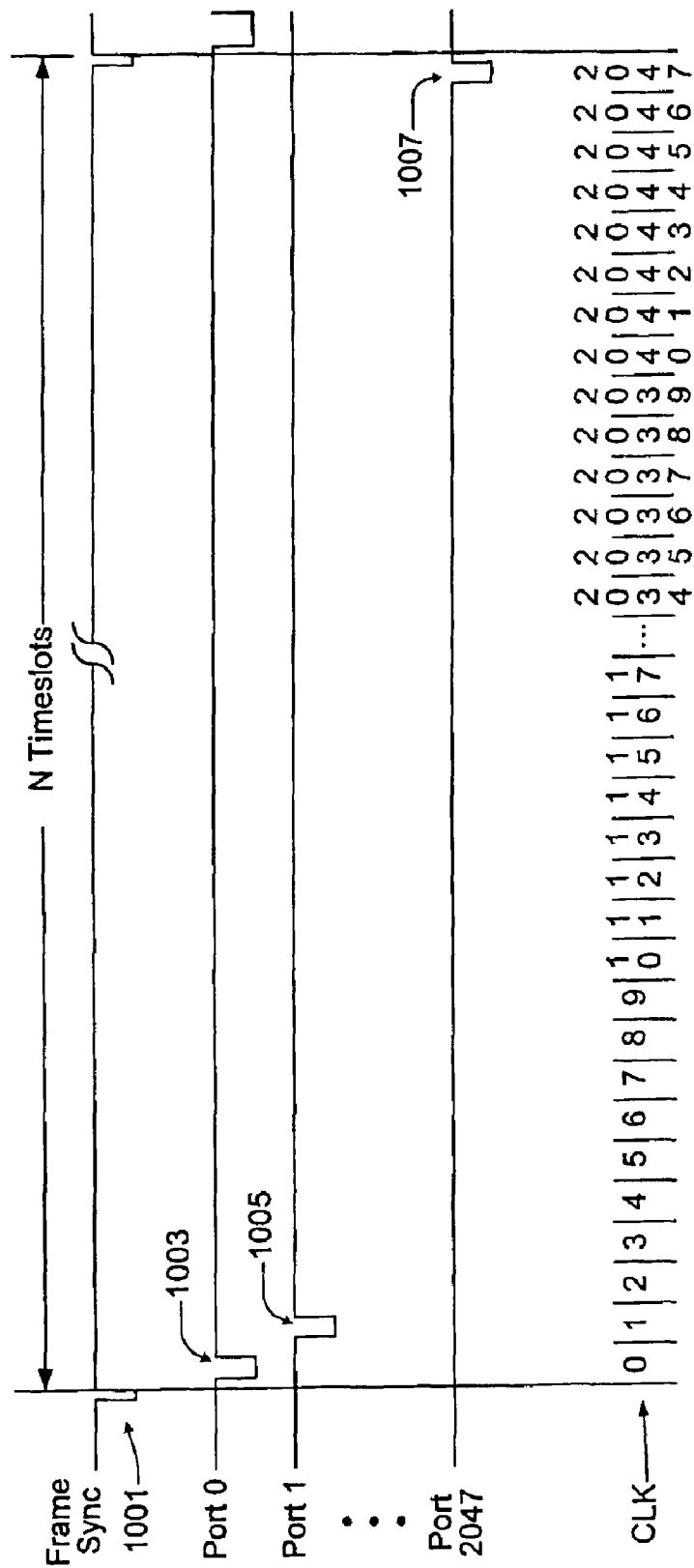
FIG. 10 illustrates a timing diagram of a specific embodiment which may be used for implementing a path verification test in accordance with the technique of the present invention.

FIG. 10 illustrates a timing diagram of a specific embodiment which may be used for implementing a path verification test in accordance with the technique of the present invention. In the example of FIG. 10, it is assumed that the DUT includes 2048 active input ports. However, it will be appreciated that the timing diagram illustrated in FIG. 10 may be scaled appropriately to accommodate testing of different DUTs having different number of input and/or output ports. As illustrated in the embodiment of FIG. 10, a Frame_Sync signal 1001 may be generated at the OSTD, and transmitted to at least one modulator circuit residing at the OSTD to thereby cause the time stamp counter of the modulator circuit to start counting from zero. According to a specific implementation, the Frame_Sync signal 1001 may be simultaneously transmitted to each of the modulator circuits residing at the OSTD.

A separate optical test signal (sometimes referred to as a "wink" signal) may be generated at the OSTD and transmitted on a particular optical fiber when a timeslot counter value is equal to a specified port ID value. Thus, for example, as shown at 1003, a first optical test signal will be transmitted from Output Port 0 of the OSTD at timeslot T=0, and a second optical test signal 1005 will be sent from Output Port 1 of the OSTD at timeslot T=1. According to a specific embodiment, the units of time of the time stamp counter(s) T may be measured in milliseconds.

It will be appreciated that the example of FIG. 10 illustrates a specific optical test pattern wherein a separate optical test signal is generated each millisecond at a different port of the OSTD. However, according to different embodiments, a variety of different optical test patterns may be generated at the OSTD in order to test different properties of the DUT. Some of the different types of tests which may be performed on the DUT are described in the present application, and others will generally be known to one having ordinary skill in the art.

It will be appreciated that the optical switch testing system of the present invention is able to provide a variety of features and/or advantages for monitoring and verifying optical signal quality associated with a DUT such as, for example, an optical switch. As described in the present application, the optical switch testing system of the present invention may be used to implement a variety of tests upon a DUT in order to measure and verify specific optical characteristics associated with the DUT. Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

What is claimed is:

1. An optical switch testing system (OSTS) for testing a device under test (DUT), the DUT including a plurality of DUT optical input ports and a plurality of DUT optical output ports, the system comprising:
   at least one processor;
   memory;
   a plurality of OSTS output ports, wherein a selected plurality of the OSTS output ports are each optically connected to a respective DUT input port;
   a plurality of OSTS input ports, wherein a selected plurality of the OSTS input ports are each optically connected to a respective DUT output port;
   an optical test stimulation component configured or designed to generate optical test signals to be transmitted to a selected plurality input ports of the DUT;
   an optical test detection component configured or designed to detect a presence or absence of light on a selected plurality output ports of the DUT; and
   a traffic analyzer, wherein the traffic analyzer is one of a SONET traffic analyzer and a Gigabit Ethernet traffic analyzer.

2. The system of claim 1 wherein the DUT includes a photonic optical cross-connect device.

3. The system of claim 1 wherein the optical test stimulation component is further configured or designed to generate optical test signals to be transmitted to a selected plurality input ports of the DUT at substantially a same time; and wherein the optical test detection component is further configured or designed to detect a presence or absence of light on a selected plurality output ports of the DUT at substantially a same time.

4. The system of claim 1 further comprising:
   a first OSTS output port optically connected to a first DUT input port;
   a second OSTS output port optically connected to a second DUT input port;
   a first OSTS input port optically connected to a first DUT output port; and
   a second OSTS input port optically connected to a second DUT output port.

5. The system of claim 1 wherein the optical test stimulation component includes:
   at least one light source; and
   at least one modulator circuit configured or designed cause a modulated light signal to be transmitted at a specific time to at least one designated DUT input port.

6. The system of claim 5 wherein the at least one modulator circuit includes a separate modulator circuit for each active input port associated with the DUT.

7. The system of claim 5 wherein the at least one light source includes at least two lasers configured or designed to produce light at different frequencies.

8. The system of claim 1 wherein the optical test detection component includes:
   a plurality of photo detectors; and
   a plurality of demodulator circuits configured or designed measure properties associated with light detected at a plurality of selected DUT output ports.

9. The system of claim 8 wherein said properties include:
   power levels of light detected at selected ports of the DUT; and
   time values corresponding to instances when specific optical signals were detected at selected DUT output ports.

10. The system of claim 8 wherein the plurality of photo detectors includes a separate photo detector for each active output port associated with the DUT.

11. An optical switch testing system (OSTS) for testing a device under test (DUT), the DUT including a plurality of DUT optical input ports and a plurality of DUT optical output ports, the system comprising:
    at least one processor;
    memory;
    a plurality of OSTS output ports, wherein a selected plurality of the OSTS output ports are each optically connected to a respective DUT input port;
    a plurality of OSTS input ports, wherein a selected plurality of the OSTS input ports are each optically connected to a respective DUT output port;
    an optical test stimulation component configured or designed to generate optical test signals to be transmitted to a selected plurality input ports of the DUT;
    an optical test detection component configured or designed to detect a presence or absence of light on a selected plurality output ports of the DUT, wherein the optical test detection component includes a plurality of photo detectors and a plurality of demodulator circuits configured or designed measure properties associated with light detected at a plurality of selected DUT output ports, wherein the plurality of demodulator circuits includes at least 8 separate demodulator circuits.

12. The system of claim 1 wherein the traffic analyzer is a SONET traffic analyzer.

13. The system of claim 1 wherein the traffic analyzer is a Gigabit Ethernet traffic analyzer.

14. An optical switch testing system (OSTS) for testing a device under test (DUT), the DUT including a plurality of DUT optical input ports and a plurality of DUT optical output ports, the system comprising:

at least one processor;

memory;

a plurality of OSTS output ports, wherein a selected plurality of the OSTS output ports are each optically connected to a respective DUT input port;

a plurality of OSTS input ports, wherein a selected plurality of the OSTS input ports are each optically connected to a respective DUT output port;

an optical test stimulation component configured or designed to generate optical test signals to be transmitted to a selected plurality input ports of the DUT;

an optical test detection component configured or designed to detect a presence or absence of light on a selected plurality output ports of the DUT, wherein the optical test detection component includes a plurality of photo detectors and a plurality of demodulator circuits configured or designed measure properties associated with light detected at a plurality of selected DUT output ports, and a polarization scambler configured or designed to scramble or randomize a state of polarization of test optical signals generated by the OSTS.

15. The system of claim 1 further comprising at least one power meter for measuring a power level of light.

16. A method for performing testing of an optical device under test (DUT), the DUT including a plurality of DUT optical input ports and a plurality of DUT optical under output ports, the testing being performed by an optical switching testing system (OSTS), the OSTS including a plurality of OSTS output ports optically connected to a plurality of DUT input ports, the OSTS further including a plurality of OSTS input ports optically connected to a plurality of DUT output ports, the method comprising:

configuring components of the OSTS in order to perform a specific test on the DUT;

configuring a first test scenario at the OSTS;

transmitting at least one optical test signal to at least one DUT input port;

obtaining test results by monitoring at least one DUT output port for the presence or absence of light;

analyzing the test results for specific characteristics; and performing at least one of optical cross-talk testing, insertion loss testing or path switching time testing on the DUT.

17. The method of claim 16 further comprising:

automatically reconfiguring the DUT for a second test scenario;

automatically implementing the specific test on the DUT; and obtaining test results associated with the second test scenario from the DUT.

18. The method of claim 16 further comprising automatically transmitting a plurality of optical test signals to a plurality of DUT input ports during the first test scenario.

19. The method of claim 18 wherein the plurality of optical test signals are transmitted at substantially a same time to the DUT input ports.

20. The method of claim 16 further comprising automatically monitoring a plurality of DUT output ports for test results during the first test scenario.

21. The method of claim 20 wherein the plurality of DUT output ports are monitored at substantially a same time for test results.

22. The method of claim 16 further comprising performing static optical cross-talk testing on the DUT, wherein the static optical cross-talk testing includes automatically performing a plurality of separate static optical cross-talk testing operations on a selected plurality of different optical paths associated with the DUT.

23. The method of claim 16 wherein transitional optical cross-talk testing is performed on the DUT, and the transitional optical cross-talk testing includes automatically performing a plurality of separate transitional optical cross-talk testing operations on a selected plurality of different optical paths associated with the DUT.

24. The method of claim 16 wherein optical path stability testing is performed on the DUT, wherein the optical path stability testing includes automatically performing a plurality of separate optical path stability testing operations on a selected plurality of different optical paths associated with the DUT.

25. The method of claim 16 further comprising performing data integrity testing on the DUT, wherein the data integrity testing includes automatically performing a plurality of separate data integrity testing operations on a selected plurality of different optical paths associated with the DUT.

26. The method of claim 16 wherein insertion loss testing is performed on the DUT, wherein the insertion loss testing includes automatically performing a plurality of separate insertion loss testing operations on a selected plurality of different optical paths associated with the DUT.

27. The method of claim 16 wherein path switching time testing is performed on the DUT, wherein the path switching time testing includes automatically performing a plurality of separate path switching time testing operations on a selected plurality of different optical paths associated with the DUT.

28. The method of claim 16 further comprising performing path verification testing on the DUT, wherein the path verification testing includes automatically performing a plurality of separate path verification testing operations on a selected plurality of different optical paths associated with the DUT.

29. An optical switch testing system (OSTS) for testing a device under test (DUT), the DUT including a plurality of DUT optical input ports and a plurality of DUT optical output ports, the system comprising:

at least one processor;

memory;

a plurality of OSTS output ports, wherein a selected plurality of the OSTS output ports are each optically connected to a respective DUT input port;

a plurality of OSTS input ports, wherein a selected plurality of the OSTS input ports are each optically connected to a respective DUT output port;

an optical test stimulation component configured or designed to generate optical test signals to be transmitted to a selected plurality input ports of the DUT; and an optical test detection component configured or designed to detect a presence or absence of light on a selected plurality output ports of the DUT;

the system being configured or designed to configure components of the OSTS in order to perform a specific test on the DUT;

the system being further configured or designed to configure a first test scenario at the DUT;

the system being further configured or designed to transmit at least one optical test signal to at least one DUT input port;

the system being further configured or designed to obtain test results by monitor at least one DUT output port for the presence or absence of light;

the system being further configured or designed to analyze the test results for specific characteristics; and the system being further configured or designed to automatically perform at least one of (i) a plurality of separate optical cross-talk testing operations on a selected plurality of different optical paths associated with the DUT, (b) a plurality of separate insertion loss testing operations on a selected plurality of different optical paths associated with the DUT or (c) a plurality of separate path switching time testing operations on a selected plurality of different optical paths associated with the DUT.

30. The system of claim 29 being further configured or designed to automatically reconfigure the DUT for a second test scenario;

the system being further configured or designed to automatically implementing the specific test on the DUT; and the system being further configured or designed to obtain test results associated with the second test scenario from the DUT.

31. The system of claim 29 being further configured or designed to automatically transmit a plurality of optical test signals to a plurality of DUT input ports during the first test scenario.

32. The system of claim 31 wherein the plurality of optical test signals are transmitted at substantially a same time to the DUT input ports.

33. The system of claim 29 being further configured or designed to automatically monitor a plurality of DUT output ports for test results during the first test scenario.

34. The system of claim 33 wherein the plurality of DUT output ports are monitored at substantially a same time for test results.

35. The system of claim 29 wherein the system is configured or designed to automatically perform a plurality of separate static optical cross-talk testing operations on a selected plurality of different optical paths associated with the DUT.

36. The system of claim 29 wherein the system is configured or designed to automatically perform a plurality of separate transitional optical cross-talk testing operations on a selected plurality of different optical paths associated with the DUT.

37. The system of claim 29 being further configured or designed to automatically perform a plurality of separate optical path stability testing operations on a selected plurality of different optical paths associated with the DUT.

38. The system of claim 29 being further configured or designed to automatically perform a plurality of separate data integrity testing operations on a selected plurality of different optical paths associated with the DUT.

39. The system of claim 29 wherein the system is configured or designed to automatically perform a plurality of separate insertion loss testing operations on a selected plurality of different optical paths associated with the DUT.

40. The system of claim 29 wherein the system is configured or designed to automatically perform a plurality of separate path switching time testing operations on a selected plurality of different optical paths associated with the DUT.

41. The system of claim 29 being further configured or designed to automatically perform a plurality of separate path verification testing operations on a selected plurality of different optical paths associated with the DUT.

42. An optical switch testing system (OSTS) for testing a device under test (DUT), the DUT including a plurality of DUT optical input ports and a plurality of DUT optical output ports, the system comprising:

at least one processor;

memory;

a plurality of OSTS output ports, wherein a selected plurality of the OSTS output ports are each optically connected to a respective DUT input port;

a plurality of OSTS input ports, wherein a selected plurality of the OSTS input ports are each optically connected to a respective DUT output port;

an optical test stimulation component configured or designed to generate optical test signals to be transmitted to a selected plurality input ports of the DUT;

an optical test detection component configured or designed to detect a presence or absence of light on a selected plurality output ports of the DUT;

means for configuring components of the OSTS in order to perform a specific test on the DUT;

means for configuring a first test scenario at the DUT;

means for transmitting at least one optical test signal to at least one DUT input port;

means for obtaining test results by monitoring at least one DUT output port for the presence or absence of light;

means for analyzing the test results for specific characteristics; and means for automatically performing a plurality of separate testing operations on a selected plurality of different optical paths associated with the DUT, wherein the testing operations are selected from the group consisting of optical cross-talk testing operations, insertion loss testing operations and separate path switching time testing operations.

43. The system of claim 42 further comprising:

means for automatically reconfiguring the DUT for a second test scenario;

means for automatically implementing the specific test on the DUT; and means for obtaining test results associated with the second test scenario from the DUT.

44. The system of claim 42 further comprising means for automatically transmitting a plurality of optical test signals to a plurality of DUT input ports during the first test scenario.

45. The system of claim 44 wherein the plurality of optical test signals are transmitted at substantially a same time to the DUT input ports.

46. The system of claim 42 further comprising means for automatically monitoring a plurality of DUT output ports for test results during the first test scenario.

47. The system of claim 46 wherein the plurality of DUT output ports are monitored at substantially a same time for test results.

* * * * *

UNITED STATES PATENT AND TRADEMARK OFFICE
CERTIFICATE OF CORRECTION

PATENT NO. : 6,959,126 B1
DATED : October 25, 2005
INVENTOR(S) : Lofland et al.

It is certified that error appears in the above-identified patent and that said Letters Patent is hereby corrected as shown below:

Column 7,
Line 32, change "or" to -- of -- (second occurrence).

Column 10,
Line 9, change "in according" to -- in accordance --.

Column 12,
Line 28, change "optional" to -- optical --.
Line 50, change "occur is" to -- occur if --.

Column 17,
Line 33, delete "under".
Line 41, change "OSTS" to -- DUT --.

Signed and Sealed this

Sixth Day of June, 2006

JON W. DUDAS
*Director of the United States Patent and Trademark Office*